United States Patent
Correa et al.

(10) Patent No.: US 9,899,110 B2
(45) Date of Patent: Feb. 20, 2018

(54) METHOD AND PLANT FOR THE WET-ROUTE OXIDATION TREATMENT OF HAZARDOUS ORGANIC WASTE, NOTABLY RADIOACTIVE WASTE, CONTAINING MINERAL FILLERS

(71) Applicant: GRANIT TECHNOLOGIES S.A, Orbe (CH)

(72) Inventors: Boris Correa, Lausanne (CH); Olivier Mercier, Gryon (CH)

(73) Assignee: Granit Technologies and Engineering (GRT) SA, Orbe (CH)

( * ) Notice: Subject to any disclaimer, the term of this patent is extended or adjusted under 35 U.S.C. 154(b) by 0 days.

(21) Appl. No.: 14/897,930

(22) PCT Filed: Jun. 12, 2014

(86) PCT No.: PCT/CH2014/000081
§ 371 (c)(1),
(2) Date: Dec. 11, 2015

(87) PCT Pub. No.: WO2014/198006
PCT Pub. Date: Dec. 18, 2014

(65) Prior Publication Data
US 2016/0141059 A1 May 19, 2016

(30) Foreign Application Priority Data
Jun. 13, 2013 (CH) ........................................ 1117/13

(51) Int. Cl.
*G21F 9/30* (2006.01)
*G21F 9/16* (2006.01)
(Continued)

(52) U.S. Cl.
CPC ............. *G21F 9/30* (2013.01); *B01D 1/0047* (2013.01); *C02F 11/08* (2013.01); *G21F 9/08* (2013.01);
(Continued)

(58) Field of Classification Search
None
See application file for complete search history.

(56) References Cited

U.S. PATENT DOCUMENTS 2,026,969 A * 1/1936 Flynn ...................... F23G 7/001
110/220
4,272,383 A * 6/1981 McGrew .................. B01J 3/042
166/302
(Continued)

FOREIGN PATENT DOCUMENTS

WO 2010/108290 A1 9/2010
WO 2010108290 * 9/2010

OTHER PUBLICATIONS

Debellefontaine, Hubert, et al. "wet air oxidaiton . . . " Waste Management. 20, 15-25 (2000).*
(Continued)

*Primary Examiner* — Sheng H Davis
(74) *Attorney, Agent, or Firm* — Davis & Bujold PLLC; Michael J. Bujold

(57) ABSTRACT

A method and plant for wet-route oxidation treatment of hazardous organic waste products, notably radioactive wastes, which may contain mineral fillers, the waste products being treated in a secure environment. The plant comprises a closed space, with a mechanism for bringing a volume of hazardous organic waste products containing mineral fillers, adding a given quantity of water mixed with a base to the predetermined volume in order to adjust the pH to a determined value so as to make a solution and/or a liquid suspension, with a pressure reactor and with mechanism for
(Continued)

transferring the solution and/or liquid suspension into the pressure reactor, and a device for introducing an oxygen atmosphere into the pressure reactor and for pressurizing the atmosphere. A heating mechanism is provided for subjecting the contents of the pressure reactor to heat treatment at a temperature between 150° and 350° C. to complete the wet-route oxidation.

12 Claims, 1 Drawing Sheet

(51) Int. Cl.
*B01D 1/00* (2006.01)
*C02F 11/08* (2006.01)
*G21F 9/08* (2006.01)
C02F 1/04 (2006.01)
C02F 1/66 (2006.01)
C02F 11/00 (2006.01)
C02F 101/00 (2006.01)

(52) U.S. Cl.
CPC .............. *G21F 9/165* (2013.01); *G21F 9/304* (2013.01); *C02F 1/04* (2013.01); *C02F 1/66* (2013.01); *C02F 11/008* (2013.01); *C02F 2101/006* (2013.01)

(56) References Cited

U.S. PATENT DOCUMENTS

| | | | | |
|---|---|---|---|---|
| 5,133,875 A | * | 7/1992 | Carnahan | B01D 53/34 210/188 |
| 5,252,224 A | * | 10/1993 | Modell | B01D 29/117 210/695 |
| 5,777,191 A | * | 7/1998 | Shimizu | C02F 11/08 210/761 |
| 5,960,368 A | * | 9/1999 | Pierce | A62D 3/33 210/758 |
| 6,090,291 A | | 7/2000 | Akai et al. | |
| 6,150,580 A | * | 11/2000 | Janikowski | A62D 3/20 588/316 |
| 6,168,771 B1 | * | 1/2001 | Saho | A62D 3/20 423/210 |
| 8,968,574 B2 | | 3/2015 | Correa | |
| 2012/0006756 A1 | * | 1/2012 | Correa | C02F 1/02 210/742 |

OTHER PUBLICATIONS

International Search Report Corresponding to PCT/CH2014/000081 dated Aug. 13, 2014.

* cited by examiner

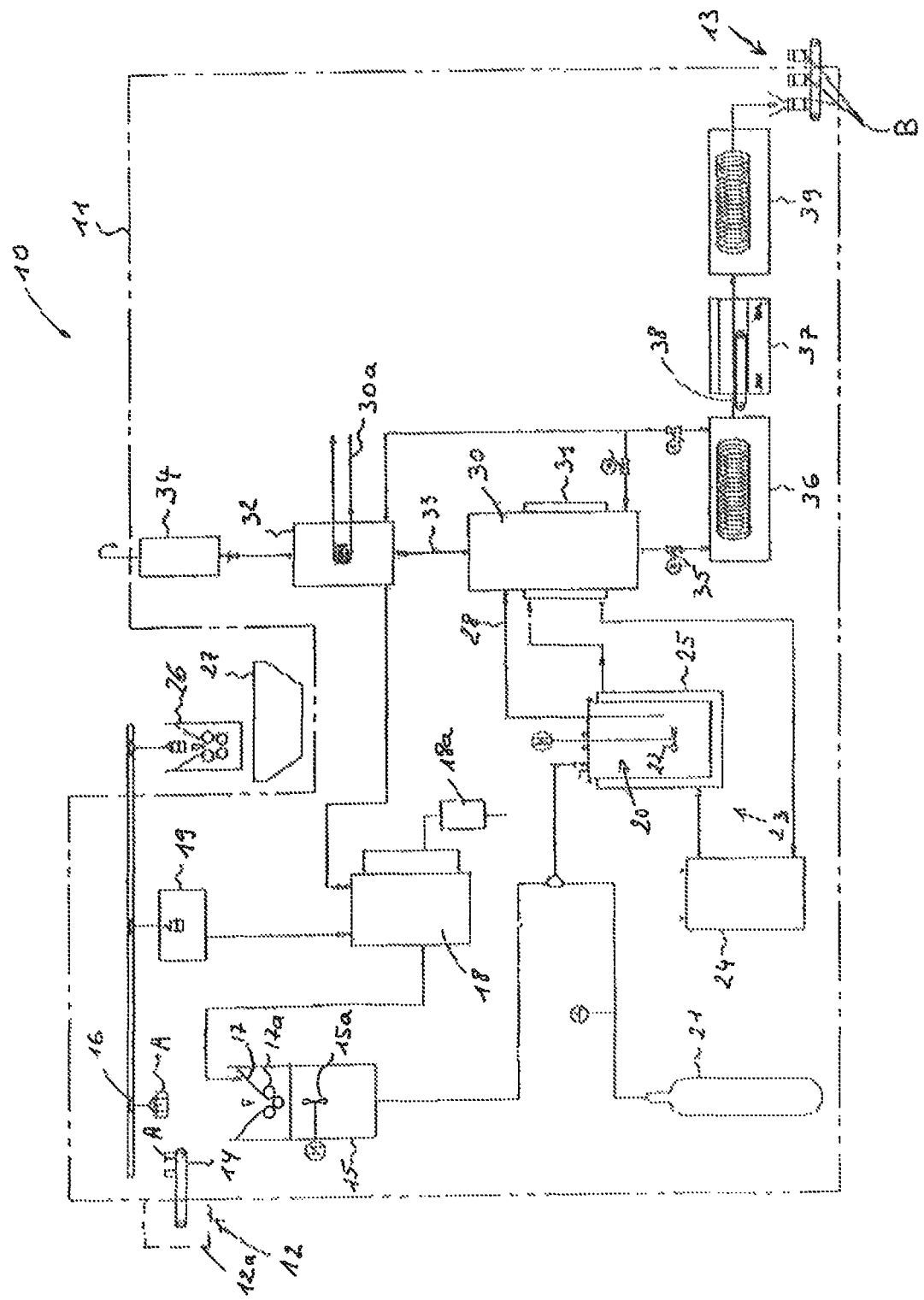

METHOD AND PLANT FOR THE WET-ROUTE OXIDATION TREATMENT OF HAZARDOUS ORGANIC WASTE, NOTABLY RADIOACTIVE WASTE, CONTAINING MINERAL FILLERS

This application is a National Stage completion of PCT/CH2014/000081 filed Jun. 12, 2014, which claims priority from Swiss patent application serial no. 1117/13 filed Jun. 13, 2013.

FIELD OF THE INVENTION

The present invention relates to a method for the wet-route oxidation treatment of hazardous organic waste products, notably radioactive wastes, which may contain mineral fillers, the said waste products being treated in a confined manner in a secure environment.

The invention also relates to a plant for implementing the said method for the wet-route oxidation treatment of hazardous organic waste products, notably radioactive wastes, which may contain mineral fillers, the said plant comprising means for confining the waste products during all the phases of their treatment.

BACKGROUND OF THE INVENTION

The principle of the method is applied industrially for the continuous treatment of liquid waste products containing mineral fillers, this treatment being carried out by wet-route oxidation. It is described in international publication WO 2010/108290 A1.

Solid organic waste products that may contain mineral substances and which pose a hazard to health, notably when the said waste products are radioactive, have to be handled with special precautions in order to avoid their dispersion, starting from the phase when the wastes are brought to a treatment site, throughout every stage of the treatment, and until their disposal after treatment. It has been found that these precautions cannot be taken when the treatment is carried out continuously, i.e. when the materials to be treated are brought to a relatively open site which does not offer the requisite guarantees of environmental security. In effect, when the site is open so as to allow the continuous supply of the materials to be treated, the risk that hazardous residues in the form of fine particles, gaseous substances or even in liquid form may leak out cannot be totally eliminated.

U.S. Pat. No. 6,090,291 describes a treatment method for the decomposition of organic or inorganic materials in a plant that maintains them in a state said to be "supercritical", i.e. in which the treatment water is at temperatures above 374° C. under a pressure in excess of 318 bars. Such a technology has fundamental differences compared with the method of the present invention, these differences including the high cost of the plant, the management of risks that are much more complex, the cost of the treatment, notably because of the treatment temperatures which are higher, entailing higher heating costs. The supercritical and sub-critical states are fundamentally different and it is not obvious, even to a person with knowledge of the field, to carry out the treatment of hazardous substances by a process of oxidation treatment while keeping the said substances in an aqueous medium which is in a subcritical state. It is also impossible to deduce from a technology that uses a method for the treatment of organic or inorganic substances in a supercritical state, the knowledge required for carrying out the treatment of hazardous substances by oxidation While maintaining them in a subcritical state.

Because of this, the knowledge of the prior art does not deprive the invention of novelty and does not constitute a basis sufficient, for a person familiar with the field, to deprive the invention of inventiveness. The invention does not follow in any evident manner from the prior art, which describes a fundamentally different technology.

SUMMARY OF THE INVENTION

The present invention provides a solution to the problem outlined above by proposing a method and a plant for treating such waste products by wet-route oxidation and using secure techniques to treat and to convey the waste products to be treated, to confine them throughout their treatment and to dispose of them at the end of the treatment while eliminating any risk of gaseous or liquid discharges from the said waste products and consequently any risk of accidental contamination resulting from such discharges. The basic requirement is to carry out all the procedures on portions of the products, each portion being taken in hand at the beginning of the treatment and undergoing the entire treatment without any modification of the material constituting the portions throughout the duration of the treatment. This mode of operation is currently called: "batch treatment".

To that end, the method according to the invention as defined in the preamble is characterized in that a certain volume of the said hazardous organic waste products which may contain mineral fillers is conveyed in a confined manner, a given quantity of water mixed with a base is added to the said predetermined volume in order to adjust the pH to a defined value so as to make up a solution and/or a liquid suspension, which is then transferred into a pressure reactor, the content of the said reactor is pressurized with an atmosphere of compressed oxygen while stirring the said solution and/or the said liquid suspension confined in the said reactor, the said reactor and its content are subjected to heat treatment at a temperature essentially between 150° and 350° C., preferably between 200° and 300° C., for a determined time in order to allow the said wet-route oxidation to proceed to completion, the said reactor and its content are then cooled by drawing off the gaseous/steam phase down to a pressure between 5 and 10 bars, and the said treated waste products are drained off in a secure manner with a view to their concentration or disposal.

Advantageously, the said given quantity of water mixed with a base can be adjusted so that the solution and/or liquid suspension contains essentially between 5% and 30%, and preferably between 8% and 15% of dry material in solution and/or in suspension.

In a preferred embodiment the volume of the solution and/or liquid suspension contained in the said reactor can correspond substantially to a filling proportion between 20% and 90%, and preferably between 60% and 80% of the internal volume of the reactor.

To carry out the wet-route oxidation, the pressure of the oxygen atmosphere in the said reactor is preferably essentially between 40 and 200 bars, and preferably between 50 and 100 bars.

To bring the oxidation operation to completion, the said solution and/or liquid suspension in the said reactor is advantageously kept in the reactor at the said oxidation treatment temperature for a time essentially between 0.2 and 4 hours.

In a preferred embodiment, the addition of the base to the said given quantity of water is advantageously such that the pH of the said solution and/or liquid suspension is between 2 and 10.

Advantageously, the content of the said reactor is cooled in two phases, namely a first phase of rapid cooling by releasing the gaseous phase, which constitutes a sort of quench, and a second cooling phase to lower the temperature of the mixture progressively down to ambient temperature.

The said first phase is preferably designed to lower the temperature by around 100° to 200° C., preferably by approximately 150° C.

Advantageously, after the second cooling stage the plant is depressurized. and during this the residual mixture of liquid and gas from the reactor is transferred to an evaporator which is at ambient pressure and which enables the concentration of the mineralized residue to be completed.

At a stage following the oxidation phase the gases and steam produced during the first cooling phase and the vaporization phase in the evaporator can be transferred to a condenser for treatment, any gases which cannot be condensed. being discharged to the atmosphere through a catalyzer.

In the final phase of the waste product treatment the solid condensation residues are advantageously treated in a mixer whose function is to mix them with neutral mineral compounds in order to form solid granulates.

For that purpose, the plant for the treatment of waste products according to the invention, as defined in the preamble, is characterized in that a volume of the said hazardous organic waste products containing mineral fillers is conveyed into it in a confined manner, a given quantity of water mixed with a base is added to the said predetermined volume in order to adjust the pH to a defined value so as to form a solution and/or a liquid suspension which is transferred into a pressure reactor, the content of the said reactor is pressurized with an atmosphere of oxygen under a maximum pressure of 100 bars while stirring the said solution and/or liquid suspension confined in the reactor, the reactor and its content are subjected to heat treatment at a temperature essentially between 150° and 350° C. and preferably temperatures dose to 280° C. for a determined time in order to complete the said wet-route oxidation, and the content of the said reactor is then cooled and the said treated waste products are drained off in a secure manner with a view to their disposal, the said treatment being carried out under so-termed "subcritical" conditions in which the water is maintained in the liquid state due to the effect of pressure.

The said means for the confined conveying of a volume of the said hazardous organic waste products comprise an inlet in the form of a controlled airlock and a belt conveyor which passes through the said closed space.

Preferably, the plant comprises a mixing tank equipped with a hopper under which is positioned a crusher to break up the waste products coming in, the said mixing tank being designed to receive a volume of water in order to form a liquid mixture in the form of a solution and/or liquid suspension containing the said crushed waste products to be treated.

The said heating equipment of the said pressure reactor advantageously comprises an oil reservoir coupled to a heating jacket that partially surrounds the pressure reactor.

Advantageously, the plant comprises an evaporator/recuperator connected to the said pressure reactor to separate the solid residues and the gaseous residues coming from the said waste products after their treatment in the said pressure reactor.

It also comprises a crystallizer designed to treat the gaseous residues coming from the said waste products after their treatment in the said pressure reactor.

The plant can also comprise a mineral particle mixer to combine the said mineral particles with the said solid residues coming from the said waste products after their treatment in the said pressure reactor.

BRIEF DESCRIPTION OF THE DRAWINGS

The present invention and its advantages will be better understood from the following description of an embodiment, given as a non-limiting example with reference to the attached drawing in which:

FIG. 1 shows a schematic general view of the plant according to the invention.

DETAILED DESCRIPTION OF THE PREFERRED EMBODIMENTS

Referring to FIG. 1, the plant 10 for the wet-route oxidation treatment of hazardous organic waste products, notably radioactive wastes that may contain mineral fillers, comprises a closed space 11 provided in particular with an inlet 12 for the waste products to be treated and an outlet 13 for the treated waste products. The closed space 11 is designed to be leakproof and to prevent any accidental leakage of hazardous substances to the outside, whether those substances are in the solid, liquid or gaseous state. Precisely because of the hazardous nature of the waste products to be treated, it is essential that the treatment space offers every guarantee of security so as to avoid any risk of contamination. Again by virtue of the said hazardous nature, the waste products are conveyed while confined in containers A, for example drums of mild steel sealed hermetically, which pass through the said inlet 12, for example in the form of a controlled airlock 12a, on a belt conveyor 14. The waste products are Mainly in the form of solids and liquids.

The treatment process involves the preparation of a solution and/or a liquid suspension by mixing the waste products contained in one or more containers A with a given quantity of water to which a base is added in order to adjust the pH to a determined value, so as to make up the said solution and/or liquid suspension. For that purpose the plant 10 comprises a mixing tank 15 which receives on the one hand a predetermined volume of waste products to be treated, coming from the containers A which are preferably sealed drums. These drums are conveyed to above the mixing tank 15 by a hoist 16 and preferably automatically sawn in two to allow their content to be tipped into a hopper 17 under Which there is a crusher 17a to break up the waste products before releasing them into the inside of the mixing tank 15. The crushed wastes are in the form of a powder or small particles. On the other hand, a given quantity of water is introduced into the mixing tank 15, to which a base has been added and which comes from a reservoir 18 in particular fed by a tank 19 for washing the drums, sawn and emptied as mentioned above. The washing tank 19 enables the water reservoir 18 containing water for rinsing out the drums to be supplied in part. However, if the volume of water for rinsing the drums is found to be too large, this water is treated with resins contained in an ion exchanger 18a so that any overflow can be discarded outside the plant 10. The resins can be recycled inside the plant and returned to the beginning of the process, at the level where the waste products to be treated are being crushed.

The content of the mixing tank 15, which is in the form of a mixture and/or a suspension containing essentially between 8% and 15% of dry material and preferably around 10% of dry material, is continually stirred by a stirrer 15a to ensure its homogeneity. The minimum and maximum levels of the mixture in the mixing tank are checked and adjusted, if necessary by adding some water from the reservoir 18. The pH of the mixture is checked regularly and if its acidity rises above a threshold value, a mineral base can consequently be added.

The solution is then transferred at ambient or low pressure, preferably by pumping, into a reactor 20 which is a pressure vessel, in this reactor the air can be evacuated and replaced with an oxidizing gas, for example oxygen whose pressure is increased progressively and which comes from an oxygen reservoir 21. The pressure of the oxygen atmosphere is increased essentially to a value between 40 and 200 bars, preferably between 70 and 100 bars. The filling proportion of the reactor 20 is essentially between 20% and 90%, preferably between 60% and 80% of its internal volume. The reactor 20 has a driven stirrer 22 which keeps the mixture stirred so that the treatment can take place in a uniform manner in a homogeneous mixture. Note that the oxygen could be replaced by any oxidizing gas, for example air.

The reactor 20 is provided with heating means 23 to subject its content to heat treatment at a temperature essentially between 150° and 350° C. for a determined time, in order to complete the said wet-route oxidation by virtue of the presence of an atmosphere of oxygen under pressure. Oxidation typically takes place at temperatures of the order of 200° to 280° C., but these values are not fixed and can vary depending on the nature of the waste products to be treated and depending on whether or not catalysts are used. The heating means 23 comprise an oil reservoir 24 which communicates with a heating jacket 25 that partially surrounds the reactor 20, and in which oil heated to around 400° C. circulates. Suitable regulating means enable the temperature of the waste products being treated in the reactor 20 to be kept at the defined temperature. The duration of the treatment can range between 0.2 and 4 hours, the aim being to bring the oxidation of the hazardous substances to completion.

The parts of the empty and rinsed drums above the washing tank 19 are conveyed by the hoist 16 to a drum press 26, from where they are stored in a skip 27 which allows them to be disposed of later. Note that the drum press 26 and the skip 27 are located outside the closed area 11. In effect, the drums are cleaned and rinsed in advance at a washing station and the rinse water is collected in the reservoir 18 and remains inside the closed area 11.

After the stage of wet-route oxidation treatment during which the mixture is maintained at an elevated temperature, the mixture is cooled rapidly during a first stage by the decompression of its content down to a pressure between 5 and 10 bars. A sort of quench takes place during a first cooling phase, of the order of 100° to 200° C. and preferably of the order of 150° C. During a second cooling phase the temperature of the mixture is progressively reduced down to a temperature close to 100° C. by cooling the heating oil. Since the oxidation reaction has taken place most of the carbon in the organic materials is in the form of carbon dioxide and many chemical elements are oxidized. The heat removed by the cooling water can be used for producing hot water outside the plant.

A pipe 28 connects the reactor 20 directly to an evaporator 30 which is provided with a heating jacket 31 connected in series with the oil reservoir 24 via the heating jacket 25 that partially surrounds the reactor 20. This device is used for depressurizing the plant, during which the liquid-gas mixture is drawn off toward the evaporator which is itself at ambient pressure. Vibrations can be applied, for example ultrasonic vibrations, followed by flushing with oxygen or air in order to ensure the complete emptying of the reactor. The evaporator is heated by the oil of the heating means 23. Most of the water is vaporized and the inorganic or quasi-inorganic residues containing radioactivity are concentrated in the residual liquid in solution or in suspension. Approximately 80% to 90% of the water evaporates. The gases produced ($CO_2$, residuál $O_2$ and others), mixed with steam, are drawn off from the evaporator and passed on to a condenser 32 directly connected to the evaporator 30 by a pipe 33 which connects the top of the evaporator 30 to the bottom of the condenser 32. The gases that cannot be condensed are discharged to atmosphere through a catalyzer 34 located above the condenser 32 after being checked for compliance with the environmental standards. The condenser is equipped with cooling means 30a to maintain and regulate the temperature of the condenser at an optimum value. The circuit comprising the condenser 32 and the catalyzer 34 enables the treatment of the gaseous residues coming from the reactor. The Condensed solid residues at the bottom of the condenser/decanter are re-introduced into the evaporator or injected directly through a pipe fitted with a valve 35 into a mixer 36 whose function is to mix these residues containing dry materials, for example with gypsum or with glass or any suitable neutral mineral material. The aim 1s to produce gypsum or glass granules with a particle size of the order of a millimeter or a few tens of millimeters.

This mixture is conveyed to a drier 37 by a worm conveyor 38 or similar, and then to a concrete mixer 39 in order to produce a hardenable mixture intended for pouring into drums B or other containers with a view to their storage by safe, long-term storage means. After being poured and hardened they are removed via the outlet 13 of the closed area 11.

As a conceivable alternative, the evaporation and condensation residues are sent to a filter press to eliminate most of the water. The pressed cake is injected directly into a concrete mixer. The solid residue, generally having a dryness level of 20% to 60%, is then mixed with cement in the concrete mixer. The water extracted by pressing is returned to the reservoir 19. The cake of solid residues can again be agglomerated by a process suitable for producing constituents of larger size, typically that of the granules before being mixed with the cement, this in order to reduce the final volume of concrete.

In another conceivable variant, the gypsum granulate containing the final residues can be incorporated into molten glass which, after solidification, can be encapsulated and stored in final, long-term storage containers.

Note that all the treatment and handling operations are carried out entirely automatically inside the secure space 11. However, the various implementation variants imagined do not go beyond the range of modifications that are clear to a person with knowledge of the field, and are covered by the protective scope of the present invention.

The invention claimed is:

1. A method of wet-route oxidation treatment of hazardous organic waste products, containing radioactive wastes and mineral fillers, the waste products being treated in a pressure reactor which is located within a confined and closed space, the method comprising:

conveying a certain predetermined volume of the hazardous organic waste products, containing the mineral fillers, called a first part of a content, into the pressure reactor which is located within the confined and closed space, adding a given quantity of water mixed with a base, called a second part of the content to the first part of the content, in order to adjust a pH to a determined value and make up a solution and/or a liquid suspension comprising the content into the pressure reactor located within the confined and closed space, pressurizing said content of the pressure reactor, at ambient temperature, with an oxygen atmosphere under a maximum pressure of 60 bars while stirring the solution and/or liquid suspension confined within the reactor, heating the contents of the pressure reactor to a temperature between 150 and 350° C. for a determined time in order to complete the wet-route oxidation treatment, and inducing, via the temperature increase, an increase of an oxidation pressure of between 110 and 180 bars, carrying out the wet-route oxidation treatment under "subcritical" conditions in which the water remains in a liquid state during the wet-route oxidation treatment, cooling the content of the pressure reactor by a controlled release of a gaseous phase, and removing, after the wet-route oxidation treatment, the waste products, that constitute a liquid phase, within the confined and closed space, and disposing of the waste products at a final storage located outside the confined and closed space.

2. The method according to claim 1, further comprising adjusting the given quantity of water mixed with the base in such manner that the solution and/or liquid suspension contains between 5% and 30% of dry material in solution and/or in suspension.

3. The method according to claim 1, further comprising corresponding the volume of the solution and/or liquid suspension, contained in the reactor, to a filling proportion between 20% and 90% of the internal volume of the reactor.

4. The method according to claim 1, further comprising controlling the pressure of the oxygen atmosphere to be between 40 and 200 bars.

5. The method according to claim 1, further comprising maintaining the solution and/or liquid suspension, contained in the reactor, at the oxidation treatment temperature for a time between 0.2 and 4 hours.

6. The method according to claim 1, further comprising adding the given quantity of water with the base so that the pH of the solution and/or liquid suspension is between 2 and 10.

7. The method according to claim 1, further comprising cooling the content of the reactor in two phases, a first phase of rapid cooling by a controlled expansion at a pressure between 5 and 10 bars, and a second cooling phase to reduce the temperature of the mixture progressively down to a temperature close to 100° C.

8. The method according to claim 7, further comprising reducing, during the first phase, the temperature by an amount of the order of 110 to 200° C. to ensure presence of liquid in the reactor.

9. The method according to claim 1, further comprising depressurizing the mixture, after the cooling, and during this a residual mixture of liquid and gas is drawn off from the pressure reactor to an evaporator which is at ambient pressure.

10. The method according to claim 1, further comprising passing the gases produced and mixed with steam, after the oxidation treatment and discharging the gases that cannot be condensed to atmosphere through a cataiyzer.

11. A method of wet-route oxidation treatment of hazardous organic radioactive waste, which contains mineral fillers, the radioactive waste being treated under "subcritical" conditions, and the wet-route oxidation treatment of hazardous organic radioactive waste occurring in a pressure reactor which is located within a confined and closed space, the method comprising:

transferring a predetermined volume of the hazardous organic radioactive waste, containing the mineral fillers, which forms a first part of a content to be treated into the pressure reactor located within the confined and closed space;

adding, in the pressure reactor located within the confined and closed space, a second part of the content, comprising a quantity of water mixed with a base, to the first part of the content in order to adjust a pH to a predetermined pH value and form a solution and/or a liquid suspension of the content to be treated;

transferring the solution and/or the liquid suspension of the content to be treated into the pressure reactor which is also located within the confined and closed space;

pressurizing the pressure reactor with an oxygen atmosphere, at ambient temperature, to a maximum pressure of 60 bars while stirring the solution and/or liquid suspension of the content to be treated;

heating the solution and/or the liquid suspension of the content to be treated, within the pressure reactor, to a temperature between 150 and 350° C. for a period of time between 0.2 hours and 4 hours to complete the wet-route oxidation treatment of hazardous organic radioactive waste, and during such heating, inducing an increase of an oxidation pressure to between 110 and 180 bars, via the temperature increase, so that the wet-route oxidation reaction is carried out under the "subcritical" conditions and the water remains in a liquid state during the wet-route oxidation reaction;

cooling the content of the pressure reactor and controlling release of a gaseous phase from the pressure reactor;

removing inorganic or quasi-inorganic residue, containing radioactive waste, from the pressure reactor after the wet-route oxidation treatment as a residual liquid in solution or in suspension;

mixing the residual liquid in solution or in suspension with a neutral mineral material, within the confined and closed space, to form a long term storage mixture;

within the confined and closed space, removing liquid from the long term storage mixture; and transporting the long term storage mixture to a final storage site, located outside the confined and closed space, for long term storage.

12. A method of wet-route oxidation treatment of hazardous organic radioactive waste, which contains mineral fillers, the radioactive waste being treated under "subcritical" conditions, and the wet-route oxidation treatment of hazardous organic radioactive waste occurring in a pressure reactor which is located within a confined and closed space, the method comprising:

transferring a predetermined volume of the hazardous organic radioactive waste, containing the mineral fillers, which forms a first part of a content to be treated into the pressure reactor located within the confined and closed space;

adding, in the pressure reactor located within the confined and closed space, a second part of the content, comprising a quantity of water mixed with a base, to the first part of the content in order to adjust a pH to a pH value of between 2 and 10 and form a solution and/or a liquid suspension of the content to be treated;

transferring the solution and/or the liquid suspension of the content to be treated into a pressure reactor which is also located within the confined and closed space;

pressurizing the pressure reactor with an oxygen atmosphere, at ambient temperature, to a maximum pressure of 60 bars while stirring the solution and/or liquid suspension of the content to be treated;

heating the solution and/or the liquid suspension of the content to be treated, within the pressure reactor, to a temperature of 300° C. for a period of time between 0.2 hours and 4 hours to complete the wet-route oxidation treatment of hazardous organic radioactive waste, and during such heating, inducing an increase of an oxidation pressure to between 110 and 180 bars, via the temperature increase, so that the wet-route oxidation reaction is carried out under the "subcritical" conditions and the water remains in a liquid state during the wet-route oxidation reaction;

cooling the content of the pressure reactor and controlling release of a gaseous phase from the pressure reactor;

removing inorganic or quasi-inorganic residue, containing radioactive waste, from the pressure reactor after the wet-route oxidation treatment as a residual liquid in solution or in suspension;

mixing the residual liquid in solution or in suspension with a neutral mineral material, within the confined and closed space, to form a hardenable mixture;

within the confined and closed space, drying the hardenable mixture;

hardening the hardenable mixture; and transporting the hardened mixture to a final storage site, located outside the confined and closed space, for long term storage.

* * * * *